(12) United States Patent
Blard et al.

(10) Patent No.: US 6,334,520 B1
(45) Date of Patent: Jan. 1, 2002

(54) CLUTCH MECHANISM EQUIPPED WITH A WEAR TAKE-UP MODULE

(75) Inventors: Michel Blard, Issy-les-Moulineaux; Michel Graton, Paris, both of (FR)

(73) Assignee: Valeo (FR)

( * ) Notice: Subject to any disclaimer, the term of this patent is extended or adjusted under 35 U.S.C. 154(b) by 0 days.

(21) Appl. No.: 09/402,398

(22) PCT Filed: Feb. 5, 1999

(86) PCT No.: PCT/FR99/00262

§ 371 Date: Jan. 21, 2000

§ 102(e) Date: Jan. 21, 2000

(87) PCT Pub. No.: WO99/40336

PCT Pub. Date: Aug. 12, 1999

(30) Foreign Application Priority Data

Feb. 5, 1998 (FR) .................................................. 98 01453
Dec. 14, 1998 (FR) .................................................. 98 15772

(51) Int. Cl.[7] .................................................. F16D 13/75
(52) U.S. Cl. .................................... 192/70.25; 192/111 A
(58) Field of Search .............................. 192/70.25, 111 A (56) References Cited

U.S. PATENT DOCUMENTS

| | | | | |
|---|---|---|---|---|
| 3,752,286 A | * | 8/1973 | Sink | 192/111 A |
| 4,099,604 A | * | 7/1978 | Higgerson | 192/111 A |
| 4,228,883 A | * | 10/1980 | Palmer | 192/111 A |
| 5,029,687 A | * | 7/1991 | Asada et al. | 192/111 A |
| 5,090,536 A | * | 2/1992 | Asada | 192/70.25 |
| 5,251,737 A | * | 10/1993 | Flotow et al. | 192/111 A |
| 5,320,205 A | * | 6/1994 | Kummer et al. | 192/70.25 |
| 5,806,985 A | | 9/1998 | Ernig | |
| 5,816,379 A | * | 10/1998 | De Briel et al. | 192/70.25 |
| 5,937,986 A | * | 8/1999 | Schubert | 192/70.25 |
| 5,944,157 A | * | 8/1999 | Blard et al. | 192/70.25 X |
| 5,971,125 A | * | 10/1999 | Doremus et al. | 192/70.25 |

FOREIGN PATENT DOCUMENTS

| | | | |
|---|---|---|---|
| FR | 2753503 A1 | 3/1998 | |
| FR | 2764021 A1 | 12/1998 | |

* cited by examiner

*Primary Examiner*—Charles A. Marmor
*Assistant Examiner*—Saúl Rodriguez
(74) *Attorney, Agent, or Firm*—Liniak, Berenato, Longacre & White (57) ABSTRACT

The invention concerns a clutch mechanism comprising a wear take-up mechanism cassette whereof the U-shaped support (62) is characterized in that at least one of the support (62) side wings (65, 65') carries a bearing (3, 3') centrally bored (361, 361') receiving one end (69, 69') of the shaft (67, 67') of the adjusting rotating element (60, 63) and which is located in a blind hole (61, 61') in the wing wherein it is threaded and then locked, particularly by crimping (462, 462').

8 Claims, 5 Drawing Sheets

CLUTCH MECHANISM EQUIPPED WITH A WEAR TAKE-UP MODULE

The present invention concerns a friction clutch mechanism, notably for a motor vehicle, and relates more particularly to a clutch equipped with a device for compensating for the wear due notably to the wear on the friction lining or linings, this device, hereinafter referred to as a wear take-up device, operating gradually as the wear occurs on the lining or linings.

A conventional friction clutch generally has a reaction plate forming part of an engine flywheel, possibly in two parts in order to form a damping flywheel or a flexible flywheel, fixed with respect to rotation to a first shaft, usually a driven shaft such as the crankshaft of the internal combustion engine, and supporting through its external periphery a rear cover to which there is attached, with axial mobility, at least one front pressure plate.

The pressure plate is fixed with respect to rotation to the cover and reaction plate whilst being able to move axially under the action of axially acting engaging means controlled by disengaging means. The engaging means can consist of helical springs or two Belleville washers mounted in series, subjected to the action of disengaging levers forming the disengaging means.

Generally, the engaging and disengaging means form part of the same piece, for example a metallic diaphragm bearing on the cover. The diaphragm can be mounted in series or in parallel with a Belleville washer in order to provide assistance for the disengagement force.

A friction disk, carrying friction linings at its external periphery, fixed with respect to rotation to the shaft, usually a driven shaft such as the input shaft of the gearbox, is interposed between the pressure plate and the reaction plate so as to be clamped between them when the clutch is in the engagement position in order to transmit the torque from the driving shaft to the driven shaft.

Conventionally, the friction linings are mounted on an axially elastic support coupled rigidly or elastically to a hub fixed with respect to rotation to the driven shaft. By virtue of this arrangement the friction disc assists the diaphragm during the operation of disengaging the clutch. In a variant, the support is embedded at its external periphery in a friction lining.

Conventionally, the engaging means, cover and pressure plate form part of a unitary assembly referred to as a friction clutch mechanism.

The engaging means control the axial movement of the pressure plate when they are actuated by a clutch release bearing by means of the disengaging means.

The clutch release bearing can be controlled mechanically, hydraulically, electrically or electro-mechanically. The control can be of the manual, automatic or semi-automatic type.

During the service life of such a clutch, the friction lining or linings and the counter-materials, pressure plate and reaction plate wear, which cause a variation in the axial position of the pressure plate, that of the axially acting engaging means and that of the clutch release bearing, resulting in a variation in the axial clamping force between the friction disc on the one hand and the pressure and reaction plates on the other hand, because of the changes in the operating conditions of the engaging means, and the force necessary for disengaging is affected thereby. By providing such a clutch with a wear take-up device, these drawbacks are avoided, the engaging means, as well as the clutch release bearing, usually in constant abutment on the disengaging means, occupying the same position when the clutch is in the engagement position, which makes it possible to reduce the axial bulk of the friction clutch.

The French patent application FR-96.11297 filed on Sep. 17 1996 and published under the number 2 753 503 describes and depicts in FIGS. 21 to 26 a friction clutch mechanism, notably for a motor vehicle, of the type having a rear cover 52, a front pressure plate 51 connected with respect to rotation to the cover 52 while being able to move axially with respect to it, abutment means 14 carried by the pressure plate 51, axially acting engaging means 53 acting between the cover 52 and the support means 14, and a wear take-up device.

The wear take-up device comprises on the one hand means 54 with ramps 56 carrying a set of external teeth 59 and placed between the pressure plate 51 and the abutment means 14 in order to constitute a pressure plate 51, 54 with a variable thickness between its friction face and the abutment means 14 and comprises moreover a unit carried by the cover 52 and which includes a piece 62, secured to the cover 52, forming a support for fixing the unit to the cover 52.

The support 62 is roughly in a U-shape with a top central web 64, in the general form of a horizontal plate, oriented roughly tangentially, and two opposite lateral wings 65, 66, each of which extends vertically downwards in an axially oriented plane perpendicular to the top web and each of which has a hole 61 for rotatably mounting, with the interposing of bearings 3, an assembly 67, 63, 60, the piece 62 forming a support having a front fixing lug 68 which extends vertically upwards in a transverse plane perpendicular to the overall axis of the mechanism from a front transverse edge of the plate forming a central web 64 and which is fixed by riveting to a peripheral edge of the cover 52.

The assembly has notably a shaft carrying a worm, a ratchet wheel and a helical spring. The support also carries an elastic member provided on the one hand with a control tongue on the other hand with a non-return catch.

The control tongue is able to be manoeuvred by an actuator forming part of the engaging means of the clutch and cooperates, as does the catch, with the teeth on the ratchet wheel.

The worm cooperates with the teeth on a set of teeth belonging to the ramp means produced in the form of a ring with ramps disposed axially between the support means of the engaging means and the pressure plate. The worm cooperates with this set of teeth and with means of guiding in rotation, comprising the helical spring, which are made operational by the wear on the friction lining when the clutch is engaged. The worm is mounted tangentially with respect to its associated set of teeth.

It is desirable to facilitate the assembly of the components of the unit and notably to allow the inclination or not of the shaft by offsetting the holes of the wings which receive the opposite ends of the shaft.

For this purpose, the invention proposes a clutch mechanism of the type mentioned above, characterised in that at least one of the lateral wings of the support carries a bearing with a hole at the centre which receives one end of the shaft and which is housed in a blind hole in the wing in which it is slipped and then trapped, notably by crimping. By virtue of the invention, it is possible to form an assembly consisting of worm, ratchet wheel and shaft which is mounted easily in the support.

According to other characteristics of the invention:
each of the two lateral wings carries a bearing;
the holes are offset axially with respect to each other in order to incline the worm and shaft;

the central holes in the bearings are inclined in order to incline the worm and shaft;

the support carries an elastic member provided with a control tongue carried by a return on the said elastic member and a non-return catch; the non-return catch and control tongue cooperating with a ratchet wheel fixed to the worm and the return on the elastic member having two portions of different heights disposed on each side of the control tongue;

the bearings are engaged in blind holes produced in the wings and locked by crimping in the said holes.

In the above, locking by crimping, resulting in a flow of material, is a means for partially closing off the end of the blind hole and preventing the bearing from coming out. This partial closure can be effected by welding or bonding.

Naturally, other locking means can be used, for example by attaching a supplementary piece to the support at the open end of the blind hole.

This piece, after it is fixed to the support, cooperates with the bearing in order to immobilise the latter, for example by cooperation of shapes.

The supplementary piece is for example fixed by bonding, welding, force-fitting or crimping to the wings.

Naturally, all combinations are possible. Thus, one of the bearings can be trapped and locked by at least one supplementary piece or by welding or bonding. Only one of the wings may be provided with a blind hole.

It is then necessary, for example, to introduce the shaft on a slope with the bearing concerned in the closed hole, and then to cause the assembly to pivot in order to introduce the other bearing into the blind hole and finally to trap the assembly.

As a variant, at least one of the blind holes can open out in another edge of the wing.

Other characteristics and advantages of the invention will emerge from a reading of the detailed description which follows, for an understanding of which reference should be made to the accompanying drawings, in which.

In the following description, identical, similar or analogous elements or components will be designated by the same reference numbers.

In order to simplify the understanding of the description and claims, the terms horizontal, vertical, top, bottom, etc, will be used non-limitatively, notably with reference to the figures.

A description will now be given of a first embodiment illustrated in FIGS. 1 to 4.

These figures depict a clutch equipped with a wear take-up device, of the type described in the French patent application filed on Sep. 17, 1996 under the number 96 11297, to which reference should be made for more details.

Figure 1:
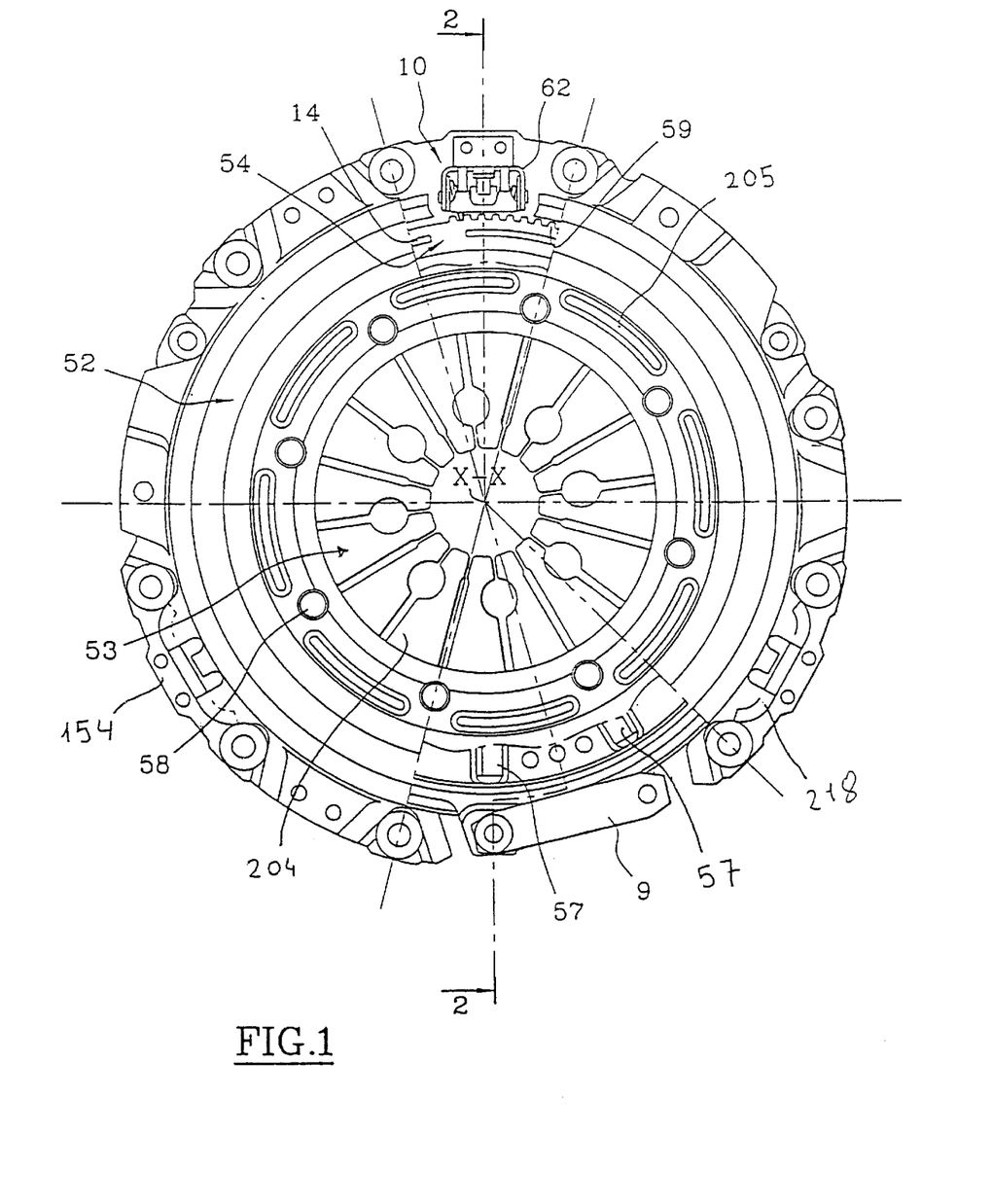
FIG. 1 is a front view of a clutch equipped with a wear take-up device with a unit according to a first embodiment of the invention, with partial cutaways in order to illustrate notably the set of teeth on the ring with ramps and the tangential tongues.

Referring to the figures, a friction clutch mechanism can be seen, notably for a motor vehicle, with an axial axis of symmetry X—X, which forms a unitary assembly and which comprises a front pressure plate 51 intended to cooperate with a friction disc (depicted schematically at 100 at the bottom of FIG. 1), carrying friction linings at its external periphery, and which itself cooperates with a reaction plate (depicted schematically at 101 at the bottom of FIG. 1). The reaction plate is intended to be fixed with respect to rotation to a driving shaft, such as the crankshaft of the internal combustion engine. The friction disc 100 is fixed with respect to rotation to a driven shaft such as the input shaft of the gearbox.

Figure 2:
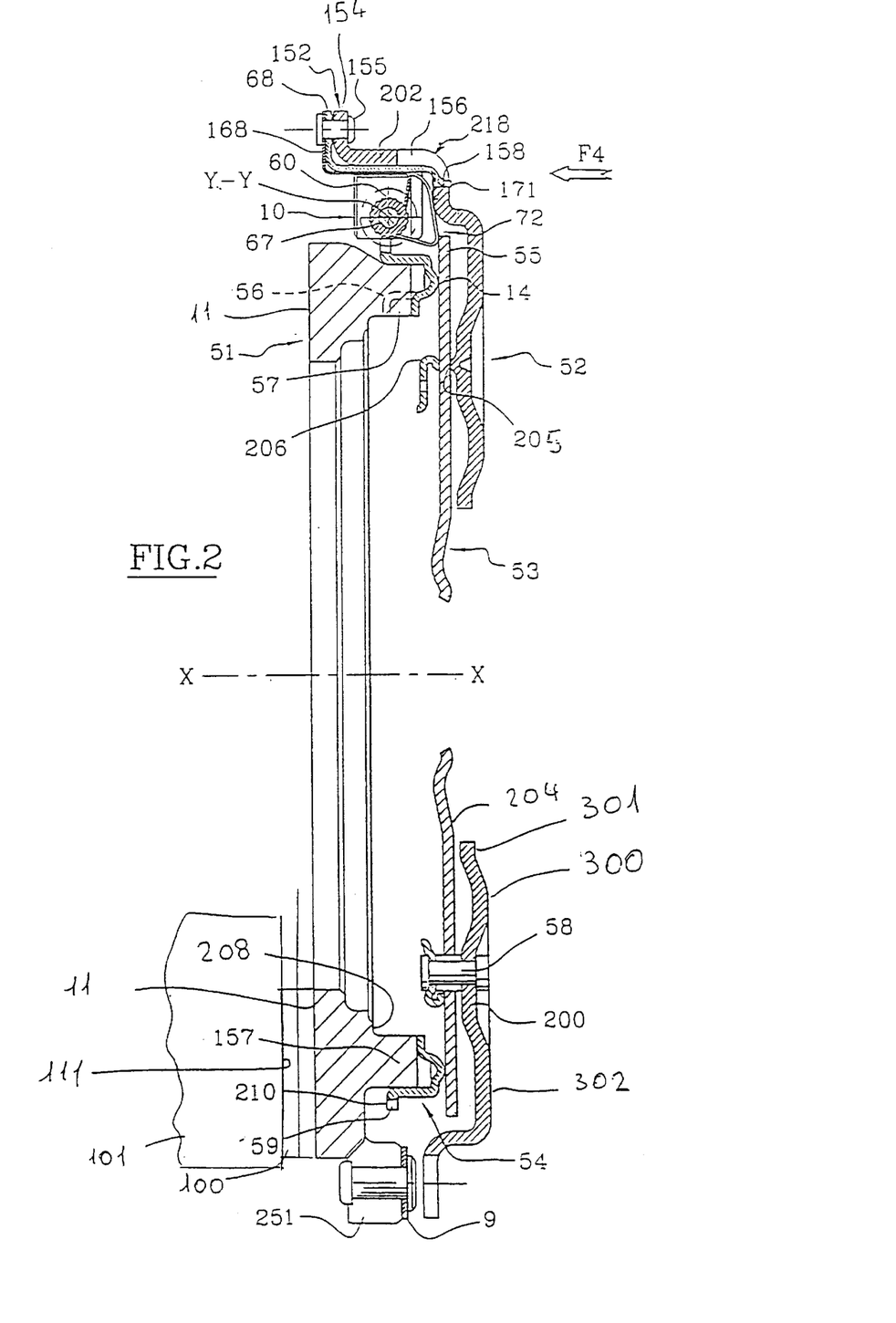
FIG. 2 is a view in section along the line 2—2 in FIG. 1.

The pressure plate 51 is fixed with respect to rotation to the cover 52 by means of tangential tongues 9, one of which is visible in FIGS. 1 and 2, and which, axially elastic, constitute at the same time means for axially returning the pressure plate 51 towards the rear in the direction of the transverse base 200 of the cover 52. In a variant, the tongues 9 are radially oriented.

The tongues 9 are fixed by riveting at one of their ends to the cover 52 and at the other end to a lug 251 on the pressure plate (FIG. 2).

The tongues 9 allow an axial movement of the pressure plate 51 with respect to the cover 52. The cover is metallic whilst being made of pressed sheet metal whilst the pressure and reaction plates are made of cast iron. This cover 52 has the transversely oriented bottom 200, with a central hole and means 152 for fixing it to a reaction plate, possibly divided in order to form a damping flywheel.

Here the cover 52 is overall in the form of a hollow dish and has at its external periphery a flange 152, roughly transversely oriented, which extends radially outwards in a vertical plane perpendicular to the axis X—X, forming notably the means of fixing the cover 52 to the reaction plate, this flange 152 provided with holes for the passage of members, such as screws, for fixing the cover to the reaction plate 101.

An axially oriented annular skirt connects the base 200 to the flange 152 and is open at the level of the tongues 9.

The reaction plate 101 can be flat or, in a variant, this plate has a skirt to which the flange 152 is fixed so that the cover 52 can be less deep.

The pressure plate 51, whilst being fixed with respect to rotation to the cover 52, is therefore able to move axially with respect to the cover 52 under the action of axially acting engaging means controlled by disengaging means, here a diaphragm 53 mounted so as to be articulated on the cover 52 by virtue of small columns 58 carried by the base 200 of the cover 52 with central hole.

The diaphragm 53, forming axially acting elastic means, has a frustoconical shape in the free state and has a peripheral part in the form of a Belleville washer extended towards the centre by a central part and divided into radial fingers 204 by slots, as can be seen in FIG. 1.

The diaphragm 53 bears, by means of its Belleville washer, on the base 200 of the cover for action on the pressure plate 51 and axial clamping of the friction linings, which the friction disc 100 has, between the pressure and reaction plates.

Here the clutch is of the pushed type, that is to say it is necessary, by means of a clutch release bearing (not shown), controlled manually or semi-automatically or automatically and not depicted, to act by pushing on the inner end of the fingers of the diaphragm 53 in order to disengage (declutch) the clutch. To do this (FIG. 2) the base of the cover 52 carries on the one hand a primary abutment 205 consisting for example of a rod, or here a dished part produced in the base of the cover at the internal periphery thereof, and on the other hand, opposite the primary abutment, a secondary abutment 206 in the form of a rolled ring carried by the small columns 58, or any other means, for example in the form of a tapered washer carried by lugs issuing by cropping and bending from the base of the cover and passing through broadened orifices in the diaphragm like the small columns 58.

The diaphragm 53, through the internal periphery of its Belleville washer, is mounted so as to tilt or pivot between the said primary 204 and secondary 206 abutments. Through the external periphery of its Belleville washer, it is in contact with abutment areas 14, described below. These areas 14, forming abutment means, are carried by the pressure plate 51.

In order, when the clutch is engaged, to keep the axially acting engaging means 53 in an axial position which is independent of the wear on the linings of the friction disc, and to a lesser extent the wear on the pressure 51 and reaction 100 plates, whose faces respectively 11 and 111, referred to as friction faces forming a rubbing track, wear in contact with the linings of the disc, a wear take-up device with ramps is provided.

The wear take-up device comprises a unit 10 and ramp means 54 disposed circumferentially.

More precisely, these ramp means 54 consist of a ring made of cropped and pressed sheet metal so as to have circumferentially disposed ramps 56. The ring also has abutment areas 14 formed by the rounded top edge of pressed parts in arcs of a circle centred on the axis of the clutch and placed radially towards the outside with respect to the ramps 56.

The pressure plate 51 has here, made by moulding, on its rear transverse face 208 turned towards the base 200 of the cover 52, radially beyond the small columns 58, studs 57 distributed circumferentially at a distance from each other which corresponds to that which circumferentially separates two successive ramps 56, the studs 57 being intended each to cooperate with a ramp 56.

The ring 54 with ramps 56 is placed axially between the diaphragm 53 and the pressure plate 51 so that the studs 57 receive the ramps 56 and the diaphragm 53 cooperates with the abutment areas 14, which thus constitute the abutment means, here divided but which as a variant can be continuous, by means of which the diaphragm 53 acts on the pressure plate 51. This arrangement is economical and simple, the ramp means 54 being metallic and obtained by pressing. As a variant the studs 57 are replaced by counter-ramps with the same shape as the ramps 54.

At least one of the abutment areas 14 of the ramp means 54 is extended at its external periphery by a flange 210 parallel to the axis of the clutch, ending in a transverse return, that is to say extending in a plane perpendicular to the axis X—X of the clutch, provided at its external periphery with a set of teeth 59, so that the abutment areas 14 can be continuous and so that the flange is centred by a thicker part 157 on the pressure plate 51, the set of teeth here being in a single piece with means with ramps 56.

It is in each thicker part 157 that the studs 57 are formed. All the thicker parts 157 can participate in the centring of the ring 54 having a continuous flange.

The wear take-up device also comprises a ratchet wheel 60 with inclined teeth fixed to a shaft 67 which also carries a worm 63. The thread and pitch of the worm 63 are adapted to the set of teeth 59. The worm 63 is caused to cooperate with the set of teeth 59 as will be described below. The worm 63 extends tangentially with respect to the set of teeth.

Figure 3:
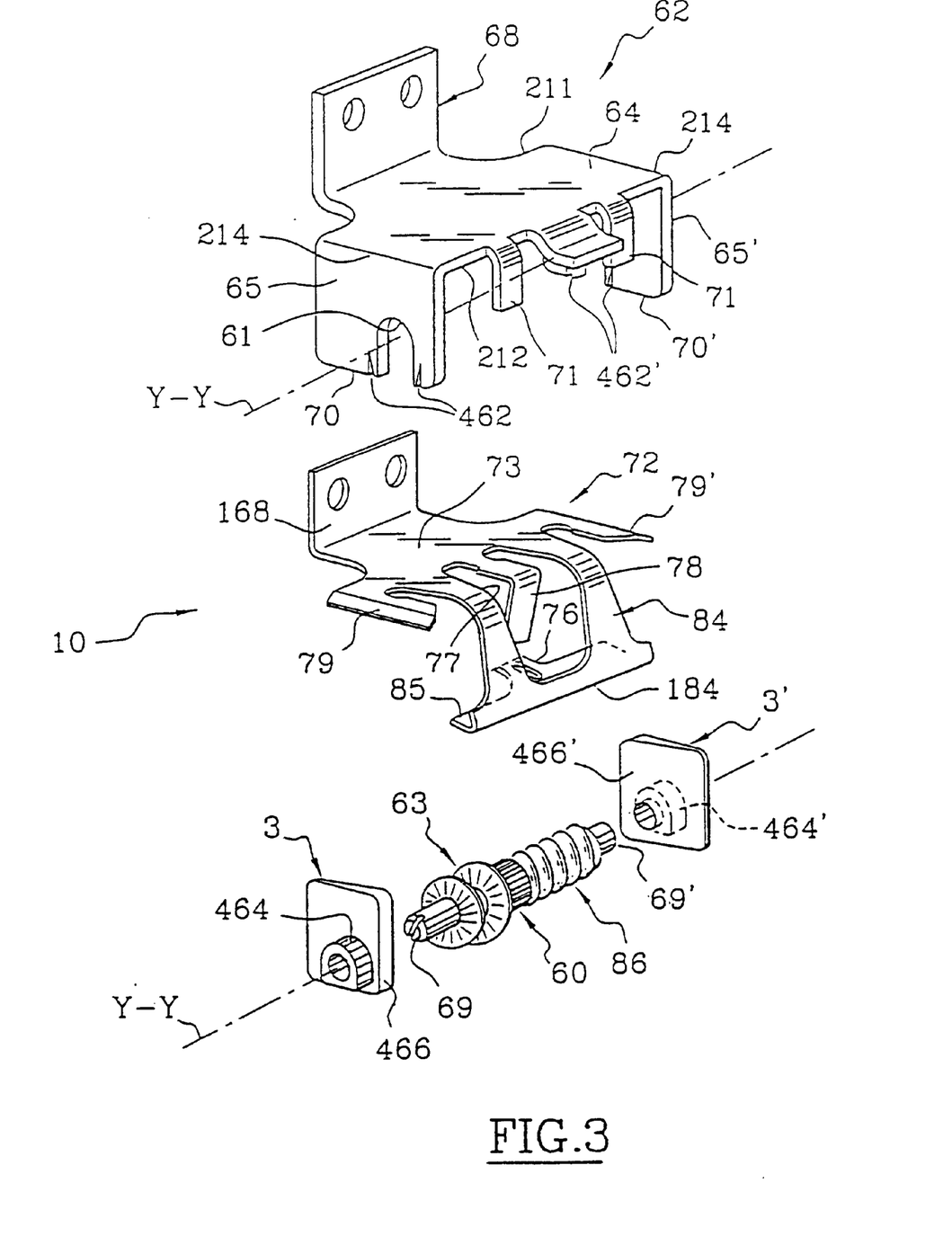
FIG. 3 is an exploded perspective view of the main components of the unit of the wear take-up device according to the invention.
Figure 4:
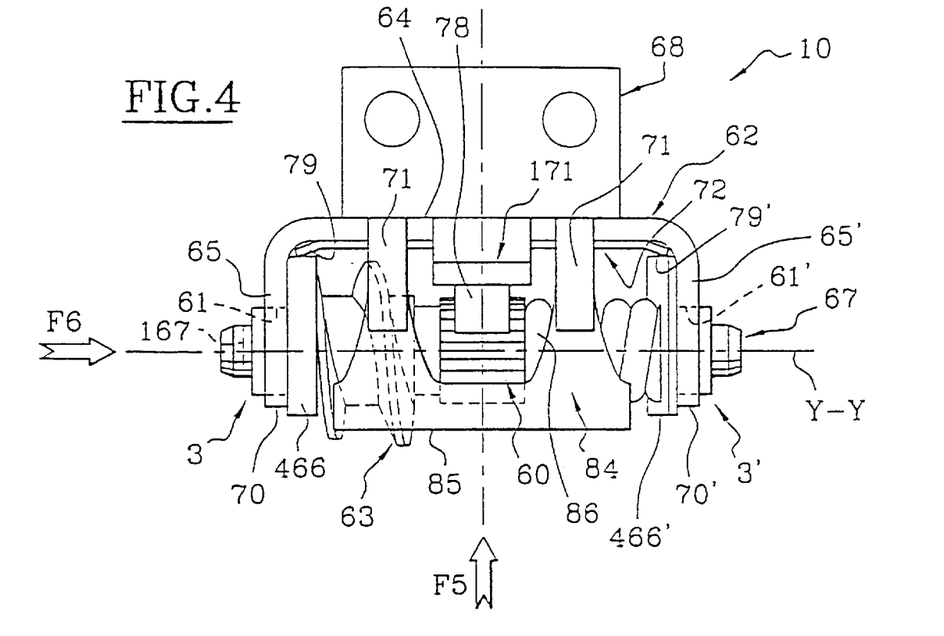
FIG. 4 is a view to a larger scale, in the direction of the arrow F4 in FIG. 2, which depicts the unit in the position with its components assembled.

The shaft 67 of the ratchet wheel 60 is carried rotatably by a support 62, more clearly visible in FIGS. 2 to 4, made of cropped and bent sheet metal, in the general shape of a U having a horizontal top web 64 in the form of a tangentially oriented plate, and having two opposite lateral wings 65, 65' intended to support the shaft 67. To this end, each of the wings carries a circular hole 61, 61' adapted to receive it with the interposing of a bearing 3, 3'.

Each lateral wing extends vertically downwards in a vertical plane parallel to the axis X—X from an axially oriented lateral edge 214 of the plate 64.

The top plate 64 has a front fixing lug 68, in a right-angled shape and directed radially outwards, which is intended to be fixed to an area 154 of the external flange 152 of the cover 52 by two rivets 55.

More precisely, the front lug 68 for fixing by riveting is a single central lug which extends vertically upwards from the front transverse edge 212 of the plate 64 in a transverse plane.

Complementary means are provided for stabilising the support 62 of the unit 10, which consist here of a stabilisation lug 171. This arrangement makes it possible to reduce the number of fixing lugs, to extend the web 64, and to stabilise the support 62, all without increasing the bulk.

To this end, the cover 52 has an opening 156 for passage of the stabilisation lug 171 which extends the web 64 axially towards the rear.

More precisely, the unit is arranged in a housing 218 projecting from the cover 52, which is delimited by the area 154 fixed to a horizontally oriented web 202 whose end opposite to the area 154 is provided with the opening 156.

The opening 156 is delimited by a bottom horizontal edge 158 which constitutes an abutment edge for the facing portion of the bottom face of the free end portion of the stabilisation lug 171.

The stabilisation lug 171 is angled twice in an S so that the horizontal plane in which its free end portion lies is offset downwards, radially towards the inside, with respect to the plane of the web 64. The lug is, in a variant, fixed to the bottom edge 158, for example by welding, bonding or crimping.

The web 64 of the support 62 has, from its rear transverse edge 212 on the opposite side to the front transverse edge 211 from which the fixing lug 68 extends, two returns 71 extending roughly perpendicularly to the web 64, radially towards the inside in the direction of the axis X—X, and intended to constitute control stops whose role will emerge hereinafter. The ends of the returns 71 are at a sufficient transverse distance from each other to allow, without interfering with it, movement of the actuator 55 during the engagement and disengagement operations. Here three housings 218 are provided (FIG. 1) and only one of the housings is used for receiving the unit 10.

The actuator 55 consists of a protuberance (or appendage) which the diaphragm 53 has radially projecting at its external periphery.

In practice the returns 71 are made by cropping and bending the web 64 and are thus disposed transversely on each side of the axial lug 171.

The support 62 is thus simple in shape and is stable.

The support 62 is adapted to receive an elastic member 72, more clearly visible in FIGS. 3 to 6, which is in the shape of a right-angled bracket and which comprises an elongate flat body in the form of a horizontal upper plate 73.

On its rear transverse edge, the body 73 is extended in an oblique extension 84.

The free end of the elastic extension 84 is provided with a return 85 in the form of a transverse bar which is extended in a control tongue 76 extending in the direction of the body 74 whilst being roughly parallel to it.

A cutout 77 is provided in the extension 84 and, by means of this cutout 77 and scallops in the body 73, a non-return catch 78 is produced in the form of a blade. The free end of the catch 78 extends roughly perpendicularly to the body 73, that is to say radially inwards.

Here, as can be seen more clearly in FIG. 3, the control tongue 76 and catch 78 are slightly inclined respectively with respect to the plane of the body 73 and to the plane perpendicular to the plane of the body 73.

The catch 78 is offset with respect to the tongue 76, the free ends of the catch 78 and tongue 76 being offset circumferentially.

Figures 6, 7:
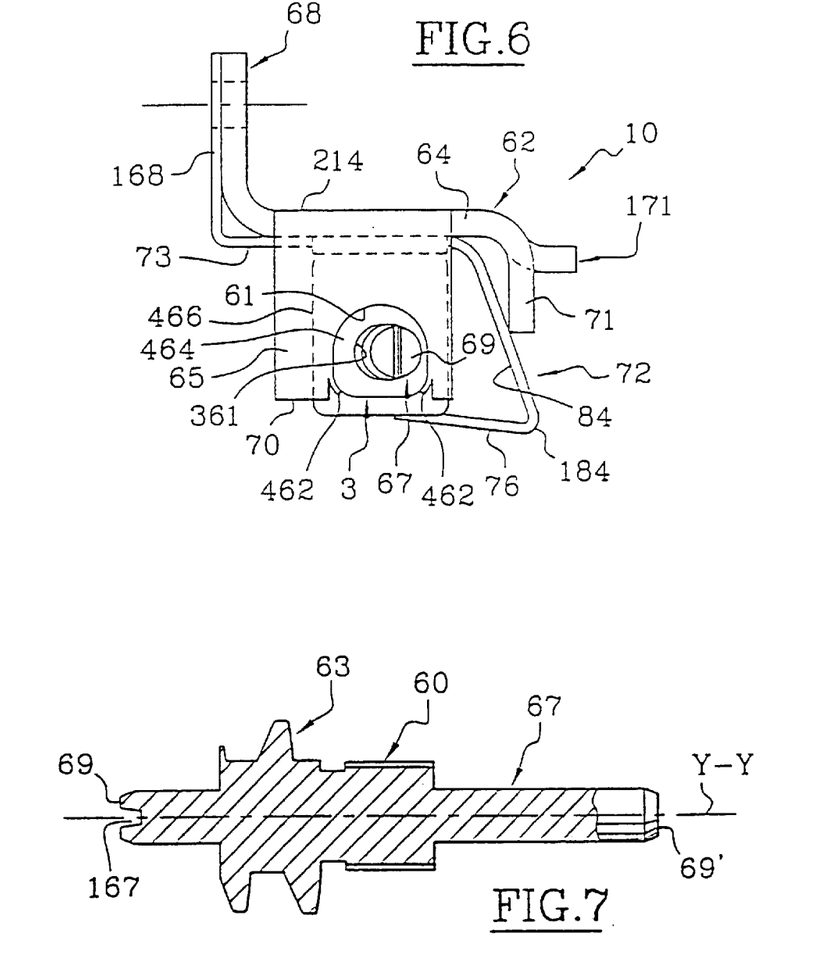
FIG. 6 is a side view in the direction of the arrow F6 in FIG. 4.
FIG. 7 is a view in axial section of the assembly carried by the support of the unit, according to a first example of a single-piece design.
Figure 8:
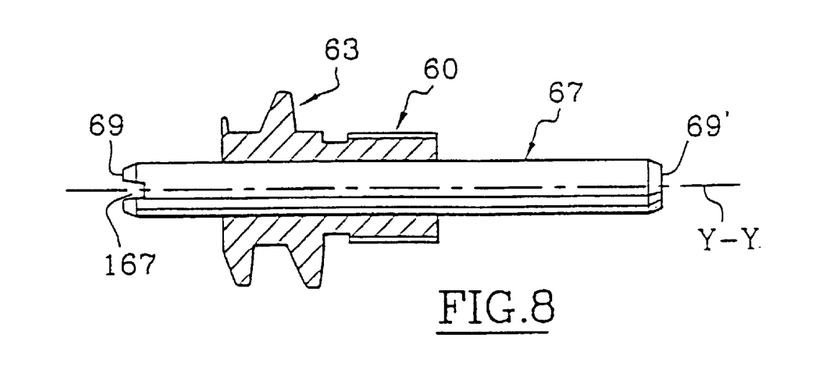
FIG. 8 is a view similar to that of FIG. 4 which depicts another example embodiment of the assembly with the ratchet wheel and worm in a single piece attached to a shaft.

A helical compression spring 86 is placed between the ratchet wheel 60 and the free end of the arm 74, whilst being wound around the shaft 67. As can be seen in FIGS. 7 and 8, the worm 63 and ratchet wheel 60 are cut from the same piece, which can be in a single piece with the shaft 67 (FIG. 7) or attached to the shaft 67 (FIG. 8).

The ratchet wheel 60 is located, along the axis Y—Y of the shaft 67, between the worm 63 and the spring 86 which constitutes the elastic take-up means. The ratchet wheel 60 is in line with the non-return catch 78 which, by cooperation with the inclined teeth of the ratchet wheel 60, prevents the ratchet wheel 60 from turning, as well as the worm 63, in the anti-clockwise direction as seen in FIGS. 2A, 2B.

As the support 62 carrying the ratchet wheel 60, worm 63 and helical spring 86 is fixed to the cover 82, the diaphragm 53 moves with respect to it during disengagement and re-engagement operations.

The diaphragm 53 carries at its periphery the radial appendage (or radial protuberance), referred as to an actuator 55, extending radially outside the Belleville washer part of the diaphragm 53 in order to cooperate with the extension 84 of the elastic member 72, or more precisely with a rounded area 184 connecting the main part of the extension 84 to the blade 76.

It will be understood that, by virtue of this arrangement, when the diaphragm 53 tilts during disengagement and re-engagement operations, the actuator 55 moves the extension 84 from right to left, as seen in FIG. 1, and the control tongue 76, by cooperation with the teeth on the ratchet wheel 60, is caused to make the ratchet wheel 60 turn in the clockwise direction and therefore to make the screw 63 turn by compressing the spring 86.

When the actuator 55, on return, is moved from left to right, the elasticity of the extension 84 of the elastic means 72 and the inclination of the teeth mean that the tongue 76 moves towards the right, climbing up the teeth, which are kept fixed with respect to rotation by the non-return catch 78.

The functioning of the clearance take-up device which has just been described is known and will not be detailed. If necessary, reference can be made to the French patent application 96 11297 already cited, where the corresponding part of the description should be considered to form part of the present application, knowing that, during the disengagement operation, the return travel or cocking of the control tongue 76 is limited by the extension 84, or more precisely the rounded area 184, coming into abutment against the returns 71 on the support 62 which is thicker than the member 72, the role of the return 71 being to preserve the elastic member 72.

Thus there is formed, in a unitary manner, a unit 10 which can be handled and transported, having parts, here all metallic, namely the support 62, the elastic member 72, the helical spring 86, the ratchet wheel 60, the worm 63 and the shaft 67, with the exception of the bearings 3, 3', the elastic member 72 having a radially oriented lug 168 pressed against the lug 68 of the support 62. The body 73 is pressed against the web 64. The lug 168 has, like the lug 68, two holes for fixing rivets 155 to pass.

A shim of variable thickness (not shown) can be interposed axially between the fixing lug 68 and the flange 152, 154 in order to adjust the axial position of the unit 10 in its housing 218 and therefore with respect to the actuator 55 according to the manufacturing tolerances and dimensional scattering of the different components of the clutch mechanism.

Naturally the elastic member 72, here metallic, has a thickness less than that of the support 62 in order to make flexible the catch 78 and the control tongue 76, which can have at its centre a protrusion by virtue of which all the mechanical stresses are taken towards the centre of the tongue 76 so that the tongue 76 is less fragile. This arrangement increases the service life of the tongue 76, the protrusion 76 being a dished part.

Figure 5:
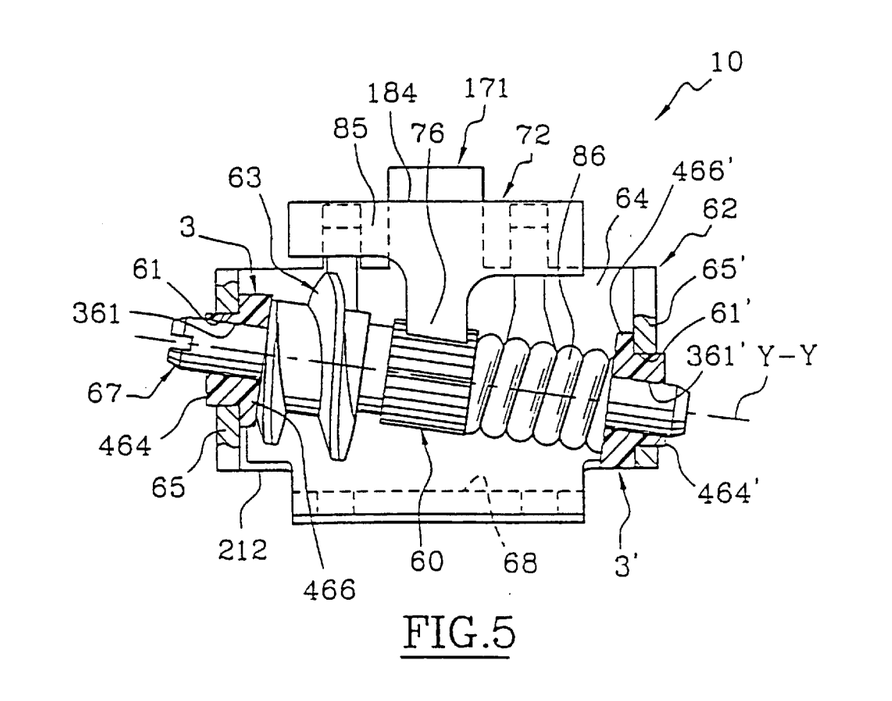
FIG. 5 is a view in the direction of the arrow F5 in FIG. 4 in which the bearings and corresponding parts of the wings of the support are illustrated in axial section.

The geometric axis Y—Y of the shaft 67 and therefore the single-piece assembly consisting of worm 63, wheel 60 and shaft 67, can be inclined with respect to the transverse vertical plane perpendicular to the axis X—X, as can be seen notably in FIG. 5. The inclination of the shaft is preferably equal to that of the thread of the worm 63.

In the embodiment of the support according to the invention illustrated in the figures, the shaft 67 has its two opposite ends 69 and 69' each carried by a bearing 3, 3' adjacent respectively to the internal faces of the wings 65 and 65'. The holes 61, 61' formed in the wings 65, 65' are aligned axially and have the same size and the same shape for mounting a shouldered bearing 3, 3' holed centrally with a hole 361, 361', each of which has passing through it an end 69, 69' of the shaft 67 of the assembly of the unit 10.

More precisely, each hole 61, 61' constitutes a bearing housing and is shaped semi-cylindrically, opening out vertically downwards in the axially oriented bottom edge 70, 70' of the corresponding wing 65, 65' of the support 62.

Each housing hole 61, 61' is delimited by two parallel edges which belong to tongues 462, 462' clamping the bearings 3, 3' in the mounted position in the holes 61, 61'. Thus the hole 61, 61' is a blind hole with a semi-circular bottom. This hole 61 has a U-shape and is delimited by two tongues 462, 462', which are then folded down to trap the bearing 3, 3'.

The bearing 3, 3' is therefore fixed by crimping by virtue of the tongues 462, on its associated wing 65, 65'. This type of design also applies to the case where the shaft is not inclined. This assists automatic mounting of all the pieces 3, 3', 60, 63, 67, 86 on the wings 65, 65'. This mounting is simple and rapid.

Each bearing 3, 3' has an external part 464, 464' with a shape complementary to that of the housing hole 61, 61' which extends transversely outwards from an internal part 466, 466' with a larger dimension and in the form of a wedge-shaped plate which is adjacent to the facing internal face of the adjacent wing 65, 65'.

The bearing 3, advantageously made of mouldable material or sintered material, with a low coefficient of friction, such as plastics material, therefore has a change in diameter in order to form a shoulder 468, 468' for axially immobilising the bearing against the internal face of the relevant wing 65, 65'.

The central hole 361, 361' in the bearing 3, 3' is inclined according to the application, whilst the holes 61, 61' are axially offset.

Thus, by virtue of the inclined central holes 361, 361' in the bearings 3, 3', the axis Y—Y of the shaft 67 is inclined by the required value for maximum contact between the tangential worm 63 and the teeth in the set of teeth 64. As in all the figures, the thread on the worm 63 has a path (movement) parallel to that of the teeth of the set of teeth 59, the dorsal faces of the bearings are inclined so as to be parallel respectively to the end face of the worm 63 and to the end of the spring 86.

The shaft 67 has, for example, at its axial end 69, a slot 167 for resetting to zero, the shaft 67 being force-fitted as in FIGS. 1 to 8 in the piece 60, 63.

Naturally the shaft 67 can be in a single piece with the wheel 60 and the worm 63. In this case (FIG. 7) it is absolutely necessary to use the attached bearings 3, 3' in order to "open" the passage holes produced in the wings 65, 65'.

It should also be noted that the elastic member 72 bears directly on the bearings 3, 3', or more precisely on the largest-sized part 466, 466' of the bearing 3, 3', whose dorsal face is inclined as can be seen in the figures.

The member 72 bears on the top of the parts 466, 466', and this elastically by virtue of the axially and horizontally oriented blades 79, 79' which are disposed in an opposite manner transversely on each side of the plate 73.

The part 466, 466' is therefore of variable width, as in FIGS. 5 and 3.

The assembly consisting of worm 63, ratchet wheel 60 and shaft 67 is in a single piece and is mounted with the spring 86 and the two bearings between the non-twisted wings 65, 65'.

The two parts 466, 466' of the bearings are in contact with the internal faces respectively of the wings 65, 65'.

The parts of reduced diameter 464, 464' of the bearing 3, 3', made of mouldable plastics material or sintered material, are slipped into the blind holes 61, 61' and then the tongues 462, 462' are folded down in order to axially lock the bearings 3, 3' by crimping.

It is not necessary for the bearing crimping tongues to be preformed, since the crimping operation can be effected by directly deforming the material of the lateral wings, for example with a tool forming a chisel. In all cases, the mounting of the assembly is facilitated.

The crimping can also be replaced by a bonding or welding operation. As a variant, the wings 65, 65' can be twisted in order to incline the shaft 67. The bearings 3, 3' then have a transverse dorsal face, whilst the twisted portions of the wings 65, 65' are parallel to each other.

Naturally, the invention is not limited to the example embodiment described. Thus, as in the document FR 98/11991, the set of teeth 59 may not be in a single piece with the ramp means 54. An intermediate piece fixed axially on the cover 52, for example by means of radial extension of two tongues 9 in the same set, may carry the set of teeth. This piece is connected with respect to rotation to the ramp means, which can move axially with respect to the intermediate piece, for example by means of a cooperation-of-shapes connection or by tongues with the same shape as the tongues 9. The presence of a non-return catch is therefore not essential, this being omitted in this embodiment. For more information, reference should be made to the document FR 98/11991. Here the base 200 of the cover 52 has at its internal periphery a domed part 300 with an internal periphery in the form of a transversely oriented ring 301. The fingers 204 of the diaphragm 53 have a winding shape at their internal periphery.

Thus, in the storage position, that is to say before mounting the friction clutch mechanism on the reaction plate or a piece secured to the reaction plate, the fingers 204 of the diaphragm come into contact with the ring 301, which preserves the unit. The ring 301 is offset axially with respect to the primary abutment 205, in the opposite direction to the pressure plate 51. The ring 301 is locating axially between the primary abutment 205 and the external face 302, turned in the opposite direction to the plate 51, of the base of the cover 52.

Here the fingers 204 come into contact with the ring 301 radially beyond their winding shape.

The cover 52 can be of a standard type and serve for a clutch mechanism not provided with a wear take-up device. For this it suffices to cut the material, according to the application, between the small columns 58, or any other means of mounting the diaphragm on the cover and ring 301.

Naturally, the unit 10 can be protected by providing a support piece which is removed after mounting the mechanism as described in the document FR 98/01769, to which reference should be made for more information.

The unit 10 does not necessarily have elastic take-up means 86. These may act for example between the studs 57 and ramps 56.

It will be appreciated that the unit is mounted by slipping axially into the housing, before it is fixed.

Naturally, the lug 68 can be omitted. This is because the housing 218 is delimited by a tangentially oriented horizontal top wall 202 whose bottom face constitutes the top abutment face for the web 64 so that it is possible to fix the web 64 by riveting against the bottom face of the wall 202.

As is clear from the drawings, the base 200 of the cover 52 is dished axially locally at the level of the small columns 58 and primary abutment 205 in the direction of the pressure plate 51, so that the ring 301 is connected to the primary abutment 205 by a domed part 300.

Naturally, this depends on the means of mounting the diaphragm on the base of the cover 52 so that the domed part 300 can have another shape. In all cases, the offcut from a conventional cover is used to form a stop 301 to protect the unit 301 or any other wear take-up device.

What is claimed is:

1. Friction clutch mechanism of the having a rear cover (52), a front pressure plate (51) connected with respect to rotation to the cover (52) while being able to move axially with respect to it, abutment means (14) carried by the pressure plate (51), axially acting engaging means (53) acting between the cover (52) and the abutment means (14), and a wear take-up device comprising on the one hand means (54) with ramps (56) fixed with respect to rotation to an external set of teeth (59) and placed between the pressure plate (51) and the abutment means (14) in order to constitute a pressure plate (51, 54) with a variable thickness between its friction face (11) and the abutment means (14) and comprising on the other hand a unit (10) carried by the cover (52) and which has a piece (62), fixed to the cover (52), forming a support roughly in a U-shape with a top central web (64), and two opposite parallel lateral wings (65, 66), each of which extends vertically downwards and each of which has a hole (61, 61') for rotatably mounting one end of a shaft (67) of an assembly (67, 63, 60) including a worm (63), cooperating with the set of teeth (59) of the ramp means, which is carried by the shaft (67), characterised in that at least one of the lateral wings (65, 65') of the support (62) carries a bearing (3, 3') with a central hole (361, 361') which receives one end (69, 69') of the shaft (67) and which is housed in a blind hole (61, 61') in the wing in which it is slipped and then trapped.

2. Mechanism according to the claim 1, wherein each of the two lateral wings (65, 65') carries a bearing (3, 3').

3. Mechanism according to claim 1, wherein the holes (61, 61', 361, 361') are offset axially with respect to each other in order to incline (Y—Y) the worm (63) and shaft (67).

4. Mechanism according to claim 2, wherein the central holes (361, 361') in the bearings (3, 3') are inclined in order to incline the worm (63) and shaft (67).

5. Mechanism according to claim 1, wherein the support (62) carries an elastic member (72) provided with a control tongue (76) carried by a return (85) on the said elastic member and a non-return catch (78), in that the non-return catch (78) and control tongue (76) are able to cooperate with a ratchet wheel (60) fixed to the worm (63) and in that the return (85) on the elastic member has two portions of different heights disposed on each side of the control tongue (76).

6. Mechanism according to claim 2, wherein the bearings (3, 3') are engaged in said blind holes (61) produced in the wings (65, 65') and locked by crimping (462, 462') in the said holes.

7. Mechanism according to claim 1, wherein the means (54) with ramps (56) are in a single piece with the set of teeth (59).

8. Mechanism according to claim 1, wherein the shaft (67) has a slot (167) for resetting to zero.

* * * * *